(12) United States Patent
Fukano et al.

(10) Patent No.: US 6,481,460 B2
(45) Date of Patent: Nov. 19, 2002

(54) TWO-WAY VALVE WITH DETACHABLE DETECTION SECTION

(75) Inventors: Yoshihiro Fukano, Ibaraki-ken (JP); Tadashi Uchino, Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/899,202

(22) Filed: Jul. 6, 2001

(65) Prior Publication Data

US 2002/0002999 A1 Jan. 10, 2002

(30) Foreign Application Priority Data

Jul. 7, 2000 (JP) ........................................ 2000-207069

(51) Int. Cl.$^7$ .............................................. F16K 37/00
(52) U.S. Cl. ........................................ 137/554; 251/285
(58) Field of Search ................................ 137/554, 556, 137/553; 251/285, 284

(56) References Cited

U.S. PATENT DOCUMENTS

| | | | | |
|---|---|---|---|---|
| 3,602,254 A | * | 8/1971 | Fawkes | ...................... 137/554 |
| 4,967,792 A | * | 11/1990 | Magee | ................... 137/554 X |
| 5,144,977 A | * | 9/1992 | Eggerton et al. | ............ 137/554 |
| 5,570,015 A | * | 10/1996 | Takaishi et al. | ......... 137/544 X |
| 5,647,397 A | * | 7/1997 | Heiniger et al. | ........ 137/556 X |
| 5,996,636 A | | 12/1999 | Fukano et al. | |

OTHER PUBLICATIONS

Co-pending U.S. Patent Application Ser. No. 09/899,195, filed Jul. 6, 2001, by Yoshihiro Fukano et al.

Co-pending U.S. Patent Application Ser. No. 09/899,196, filed Jul. 6, 2001, Yoshihiro Fukano et al.

* cited by examiner

Primary Examiner—Kevin Lee
(74) Attorney, Agent, or Firm—Paul A. Guss

(57) ABSTRACT

A two-way valve has a proximity switch attached detachably to the outside of a bonnet. A metallic detection member is connected to an end of a rod which is displaced in unison with a diaphragm for opening and closing a fluid passage in the two-way valve. The proximity switch detects the metallic detection member for detecting whether said two-way valve is in the ON state where the fluid passage is opened or the two-way valve is in the OFF state where the fluid passage is closed.

10 Claims, 3 Drawing Sheets

TWO-WAY VALVE WITH DETACHABLE DETECTION SECTION

BACKGROUND OF THE INVENTION

1. Field of the Invention

The present invention relates to a two-way valve having a first port and a second port for introducing and discharging pressurized fluid in two directions.

2. Description of the Related Art

Conventionally, two-way valves have been used in fluid pressure circuits or the like. The two-way valve has a first port and a second port for introducing and discharging pressurized fluid, and a fluid passage for communication between the first port and the second port through a valve plug which is operated under a pilot pressure supplied by a pilot port.

Typically, the two-way valve is equipped with detection means such as a sensor in the valve body near the valve plug for detecting displacement of the valve plug. The detection means supplies detection signals with a controller, and the controller confirms the displacement of the valve plug based on the detection signals.

However, according to the conventional two-way valve, in order for an operator to confirm whether the two-way valve is in the ON state where the two-way valve is open or the two-way valve is in the OFF state where the two-way valve is closed, the detection means such as the sensor for detecting the position of the valve plug is essentially provided inside the valve body. If the detection means fails to operate properly, all the components including the detection means of the two-way valve need to be replaced. Therefore, the repair cost tends to be rather high.

SUMMARY OF THE INVENTION

A general object of the present invention is to provide a two-way valve having a detection section which is detachably attached to a valve body. According to the present invention, since the detection section is accessible from the outside of the valve body, the detection section can be replaced easily with a new one. Therefore, it is not necessary to replace all the components of the two-way valve.

Another important object of the present invention is to provide a two-way valve having a flow amount adjusting mechanism for limiting the displacement of a valve plug so that the amount of the fluid flowing through a fluid passage in the two-way valve can be adjusted.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Embodiments of the present invention will be described with reference to accompanying drawings.

Figure 1:
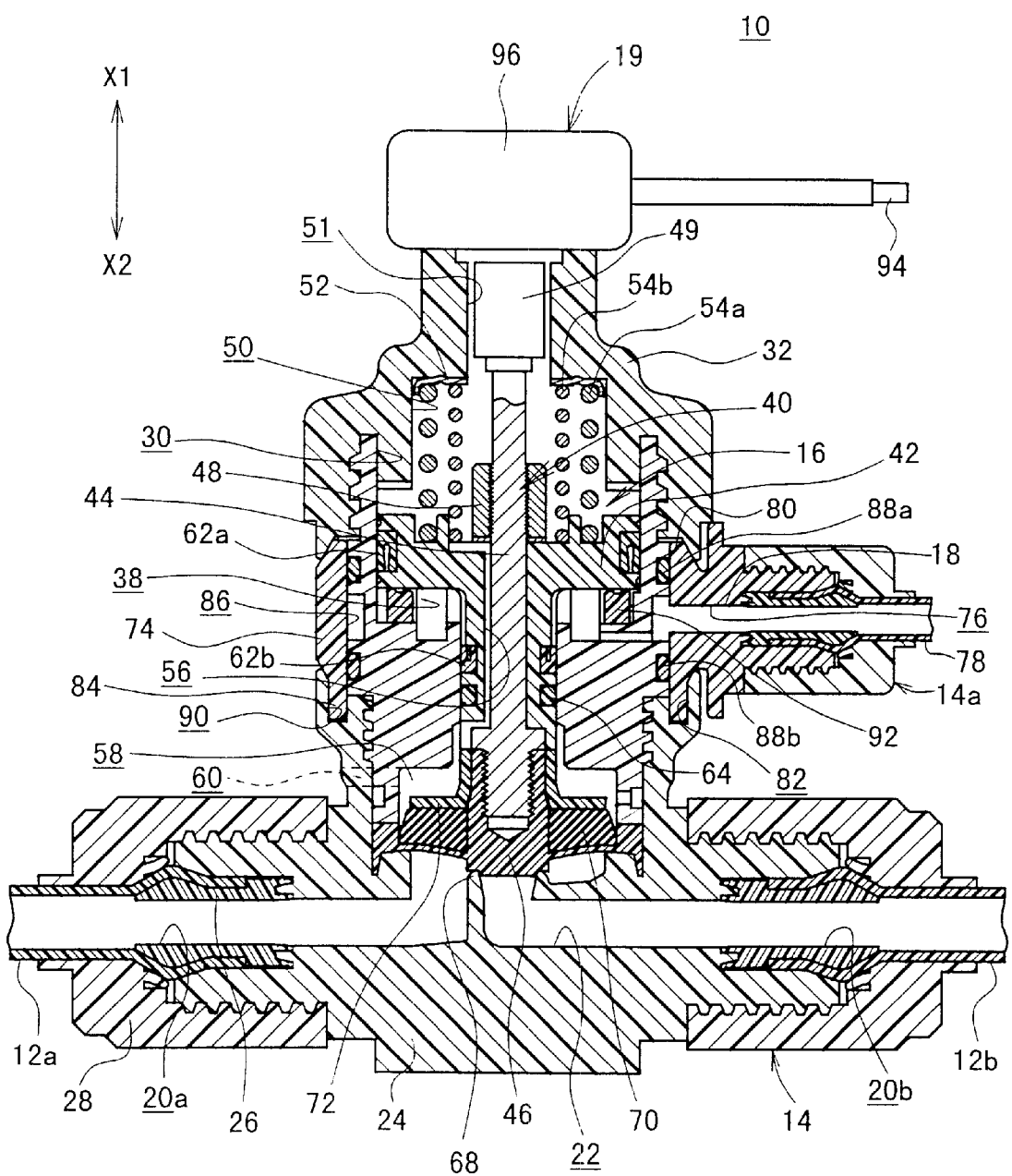
FIG. 1 is a vertical cross sectional view showing a two-way valve according to an embodiment of the present invention.

In FIG. 1, the reference numeral 10 denotes a two-way valve according to an embodiment of the present invention.

The two-way valve 10 basically comprises a joint section 14 detachably connected to a pair of tubes 12a and 12b, a valve mechanism 16 positioned over the joint section 14, a pilot pressure supplying section 18 for supplying a pilot pressure to energize the valve mechanism 16, and a detection section 19 for detecting whether the two-way valve 10 is opened (ON state) or closed (OFF state).

The joint section 14, the valve mechanism 16, and the pilot pressure supplying section 18, and the detection section 19 are assembled into a single unit.

The joint section 14 has a first port 20a and a second port 20b defined at its opposite ends, respectively. Further, the joint section 14 comprises a body 24, a pair of inner members 26, and a pair of lock nuts 28. The body 24 has a fluid passage 22 defined therein for communication between the first port 20a and the second port 20b. The inner members 26 engage with the body 24 in the first port 20a and the second port 20b and are inserted in openings of tubes 12a and 12b, respectively. The lock nuts 28 are screwed over threaded portions of the body 24 so as to ensure air-tightness or liquid-tightness at the connecting portions between the tubes 12a and 12b and the inner members 26.

Sealing is effected by engagement between the inner members 26 and other members. The inner members 26 have sealing surfaces substantially parallel to the axial line of the joint section 14. Inclined surfaces of the inner members 26 do not have sealing capability. The structure of the joint section 14 is discussed in detail in the U.S. Pat. No. 5,996,636 filed by the present applicant and the disclosures of which are herein incorporated by reference.

A substantially circular opening 30 is defined on the upper part of the body 24. The opening 30 is covered by a bonnet 32. The body 24 and the bonnet 32 function as a valve body. Further, fixing members (not shown) are attached to the lower part of the body 24 for fixing the two-way valve 10 to another member.

The valve mechanism 16 comprises a displacement mechanism 40 which is displaced along a cylinder chamber 38 in the body 24 in the directions indicated by X1 and X2, for opening and closing the fluid passage 22.

The displacement mechanism 40 comprises a piston 42 having a T-shaped cross section, a rod 44 inserted in a through hole axially defined in the piston 42, a diaphragm 46, and a nut 48. The diaphragm 46 is connected to one end of the rod 44 and displaced in unison with the piston 42. The rod 44 passes through the nut 48 so that the rod 44 can be fixed to the piston 42 by the nut 48. A columnar metallic member (detection object) 49 is connected to the other end of the rod 44 and oriented toward the opening of the bonnet 32. The metallic member 49 can be displaced upwardly and downwardly along a hole 51 in communication with the opening of bonnet 32.

A chamber 50 is formed between the piston 42 and the bonnet 32. A pair of springs 54a and 54b having different diameters, i.e., an outer spring 54a and an inner spring 54b are disposed in the chamber 50. The lower ends of the springs 54a and 54b are connected to the upper surface of the piston 42 and the upper ends of the springs 54a and 54b are seated on a substantially annular spring seat 52. The displacement mechanism 40 including the diaphragm 46 is biased downwardly (in the X2 direction) by the resilient force of the springs 54a and 54b.

A communication passage 56 running substantially parallel to the axis of the rod 44 is defined in the piston 42 for communication between the chamber 50 and a diaphragm chamber 58. Thus, air in the chamber 50 can be discharged to the outside from a fluid inlet/outlet port 60 as described later on.

The piston 42 comprises a large-diameter portion having an annular groove for attaching a first V-packing 62a and a small-diameter portion having annular grooves for attaching a second V-packing 62b and an O-ring 64.

The diaphragm chamber 58 is formed under the piston 42 and covered by the diaphragm 46. The diaphragm chamber 58 communicates with the outside through the fluid inlet/outlet port 60. Therefore, since the chamber 50 communicates with the diaphragm chamber 58 through the communication passage 56, air in the chamber 50 and the diaphragm chamber 58 can be discharged to the outside from the fluid inlet/outlet port 60.

Further, the fluid inlet/outlet port 60 is connected to a tube or the like through a tube joint (not shown). In this manner, air in the chamber 50 and the diaphragm chamber 58 can be discharged to the outside desirably. That is, the two-way valve 10 according to the present embodiment can be used in a clean room where cleanness condition needs to be maintained since the two-way valve 10 does not pollute the air in the clean room.

The diaphragm 46 is coupled to a lower part of the piston 42 by connecting the diaphragm 46 and the rod 44. Therefore, the diaphragm 46 can be displaced in unison with the rod 44 and functions as a valve plug. When the diaphragm 46 is spaced from a valve seat 68 to make a clearance between the diaphragm 46 and the valve seat 68, the fluid passage 22 is opened for allowing pressurized fluid (or non-pressurized fluid) to flow in the fluid passage 22. When the diaphragm 46 is seated on the valve seat 68, the fluid passage 22 is closed for interrupting the fluid flow in the fluid passage 22. The supply and suspension of the fluid in the fluid passage 22 can be switched smoothly.

A ring-shaped protection member 70 made of a resilient material such as rubber is provided on the upper surface of the diaphragm 46 for protecting a thin-walled portion of the diaphragm 46. The protection member 70 is supported by a bent support member 72 fixed to a lower part of the rod 44.

An annular member 74 is disposed between the body 24 and the bonnet 32. The annular member 74 is rotatable circumferentially about the axis of the rod 44. The annular member 74 has a pilot port 76 which communicates with the cylinder chamber 38. Therefore, the pilot port 76 can be set at an arbitrary position (angle) around the axis of the rod 44. The pilot port 76 is connected to a tube 78 through a joint section 14a. The joint section 14a has the same structure with a part of the joint section 14, though it has slightly smaller dimensions.

On the upper annular edge of the annular member 74, an annular projection 80 is formed. The annular projection 80 engages with a lower edge of the bonnet 32. On the lower annular edge of the annular member 74, a plurality of protrusions 84 are formed. The protrusions 84 engage with an annular guide groove 82 defined in the outer circumferential surface of the body 24. The protrusions 84 are arranged circumferentially at predetermined intervals. 5 An annular passage 86 in communication with the pilot port 76 is formed circumferentially between the annular member 74 and the body 24. The annular passage 86 is sealed air-tight by a pair of O-rings 88a and 88b.

The body 24 has recesses 90 arranged circumferentially at predetermined intervals (at predetermined degrees about the axis of the piston 42). The respective protrusions 84 of the annular member 74 engage with the recesses 90 for fixing the annular member 74 in position.

A ring-shaped shock absorbing member 92 is fitted in an annual groove of the body 24. The shock absorbing member 92 abuts against the large diameter portion of the piston 42 for absorbing shocks generated when the piston 42 is displaced downwardly.

The detection section 19 is detachably connected to the opening of the bonnet 32. The detection section 19 is positioned over the metallic detection member 49 connected to the end of the rod 44. The detection section 19 includes a proximity switch 96 for detecting the change of impedance of a detection element (not shown) in the proximity switch 96 when the metallic detection member 49 is displaced closer to and away from the proximity switch 96. The proximity switch 96 outputs detection signals to a controller (not shown) through a lead wire 94. As shown in FIG. 1, the proximity switch 96 covers the opening of the bonnet 32.

According to the present embodiment, the rod 44, the nut 48, the spring seat 52, the springs 54a, 54b, and the metallic detection member 49 are made of a metal such as stainless steel, and the other components of the two-way valve 10 (except the lead wire 94) are made of resin. Preferably, surfaces of the spring 54a and 54b are coated with Teflon (registered trademark of DuPont).

The two-way valve 10 according to the present embodiment is basically constructed as described above. Next, operations and effects of the two-way valve 10 will be described hereinbelow.

In use, the two-way valve 10 is connected to a fluid supply source (not shown) and a fluid device (not shown) through the tubes 12a and 12b connected to the first port 20a and the second port 20b, respectively. For example, the fluid supply source is connected to the first port 20a and the fluid device is connected to the second port 20b. Further, a pressurized air supply source (not shown) is connected to the pilot port 76 through a directional control valve (not shown).

Then, in the OFF state, i.e., when the diaphragm 46 is seated on the valve seat 68 and the fluid passage 22 is closed by the diaphragm 46, the pressurized air supply source is energized and a pilot pressure is supplied to the pilot port 76 by the switching action of the directional control valve. When the pilot pressure is supplied from the pilot port 76 to the cylinder chamber 38, the piston 42 is displaced upwardly in opposition to the resilient force of the springs 54a and 54b.

In this manner, the entire displacement mechanism 40 including the diaphragm 46 is displaced upwardly in unison with the piston 42. When the diaphragm 46 connected to the piston 42 through the rod 44 is spaced from the valve seat 68 by a predetermined distance, the two-way valve 10 is switched to the ON state (the fluid passage 22 of the two-way valve 10 is opened). Thus, the fluid communication between the first port 20a and the second port 20b through the fluid passage 22 is established. In this state, the fluid supplied from the fluid supply source flows into the first port 20a, flows through the fluid passage 22, and flows out of the second port 20b to the fluid device.

When the displacement mechanism 40 is displaced upwardly, the metallic detection member 49 connected to the end of the rod 44 is displaced upwardly in unison with the piston 42 and the rod 44. When diaphragm 46 is spaced from the valve seat 68 and the two-way valve 10 is switched to the ON state, the metallic member 49 is displaced closer to the proximity switch 96 and the impedance of the detection element in the proximity switch 96 is changed. The proximity switch 96 outputs data of the detected change of the impedance as a detection signal to the unillustrated controller. The controller confirms that the two-way valve 10 is switched to the ON state based on the detection signal.

Then, the supply of the pilot pressure to the pilot port 76 is interrupted by the switching action of the directional control valve. Thus, the pressure in the cylinder chamber 38 is decreased. As a result, the piston 42 is displaced downwardly by the resilient force of the springs 54a and 54b. When the diaphragm 46 is seated on the valve seat 68, the two-way valve 10 is switched to the OFF state, i.e., the two-way valve 10 is closed.

At this time, the metallic detection member 49 is displaced away from the proximity switch 96 in unison with the rod 44. Thus, the proximity switch 96 outputs a detection signal indicating that the two-way valve 10 is switched to the OFF state to the controller.

When the piston 42 is displaced downwardly, the large-diameter portion of the piston 42 abuts against the ring-shaped shock absorbing member 92 and the shock generated by the abutment is absorbed by the shock absorbing member 92. Accordingly, it is possible to reduce vibrations generated when the diaphragm 46 is seated on the valve seat 68.

According to the present embodiment, the rod 44 is displaced in unison with the piston 42 and the diaphragm 46. The metallic detection member 49 is connected to the end of the rod 44 such that the metallic detection member 49 is displaced in unison with the rod 44. Further, the proximity switch 96 for detecting the displacement of the metallic detection member 49 is detachably attached to the outer surface of the bonnet 32. Since the proximity switch 96 is disposed outside the bonnet 32 and accessible from the outside, it can be removed from, or attached to the bonnet 32 very easily. Therefore, if the proximity switch 96 needs to be replaced with a new one because the proximity switch 96 fails to operate properly or the proximity switch 96 has been deteriorated over time, it is not necessary to replace all the components of the two-way valve 10. Accordingly, it is possible to reduce the repair cost.

According to the present embodiment, the diaphragm 46 functioning as the valve plug is connected to one end of the rod 44 and the metallic detection member 49 is connected to the other end of the rod 44. Therefore, the metallic detection member 49 is displaced in unison with the diaphragm 46. With the simple structure, it is possible to detect whether the two-way valve 10 is in the ON state or in the OFF state.

Further, according to the present embodiment, the diaphragm 46, the rod 44, the metallic detection member 49, and the proximity switch 96 are aligned coaxially such that the displacement amount of the metallic detection member 49 corresponds to the displacement amount of the diaphragm 46. Therefore, it is possible to easily adjust the position of the metallic detection member 49 to be detected by the proximity switch 96 and downsize the two-way valve 10.

Further, according to the present embodiment, the annular member 74 is rotatable about the axis of the rod 44.

Therefore, it is possible to change the position of the pilot port 76 circumferentially. Thus, the direction of the pilot port 76 can be changed desirably by rotating the annular member 74. Since the position of the pilot port 76 can be changed depending on the place for installing the two-way valve 10, piping operations can be performed easily and directions of pipes can be changed freely. Accordingly, the usability of the two-way valve 10 is greatly improved.

Furthermore, according to the present embodiment, the rod 44, the nut 48, the spring seat 52, the springs 54a and 54b, and the metallic detection member 49 are made of a metal such as stainless steel, for example, while all the other components (except the lead wire 94) are made of a resin material. Accordingly, even if a certain chemical is used as fluid, the chemical will be prevented from being reformed since the chemical will not contact with any metal materials.

According to the present embodiment, the diaphragm 46, the rod 44, and the like are displaced under an action of the pilot pressure. However, the diaphragm 46, the rod 44, and the like may be displaced by energizing and de-energizing a solenoid valve (not shown).

Next, a two-way valve 100 according to another embodiment of the present invention will be described with reference to FIG. 2. In the following embodiments, the constituent elements that are identical to those elements of the two-way valve 10 shown in FIG. 1 are labeled with the same reference numeral, and description thereof is omitted.

Figure 2:
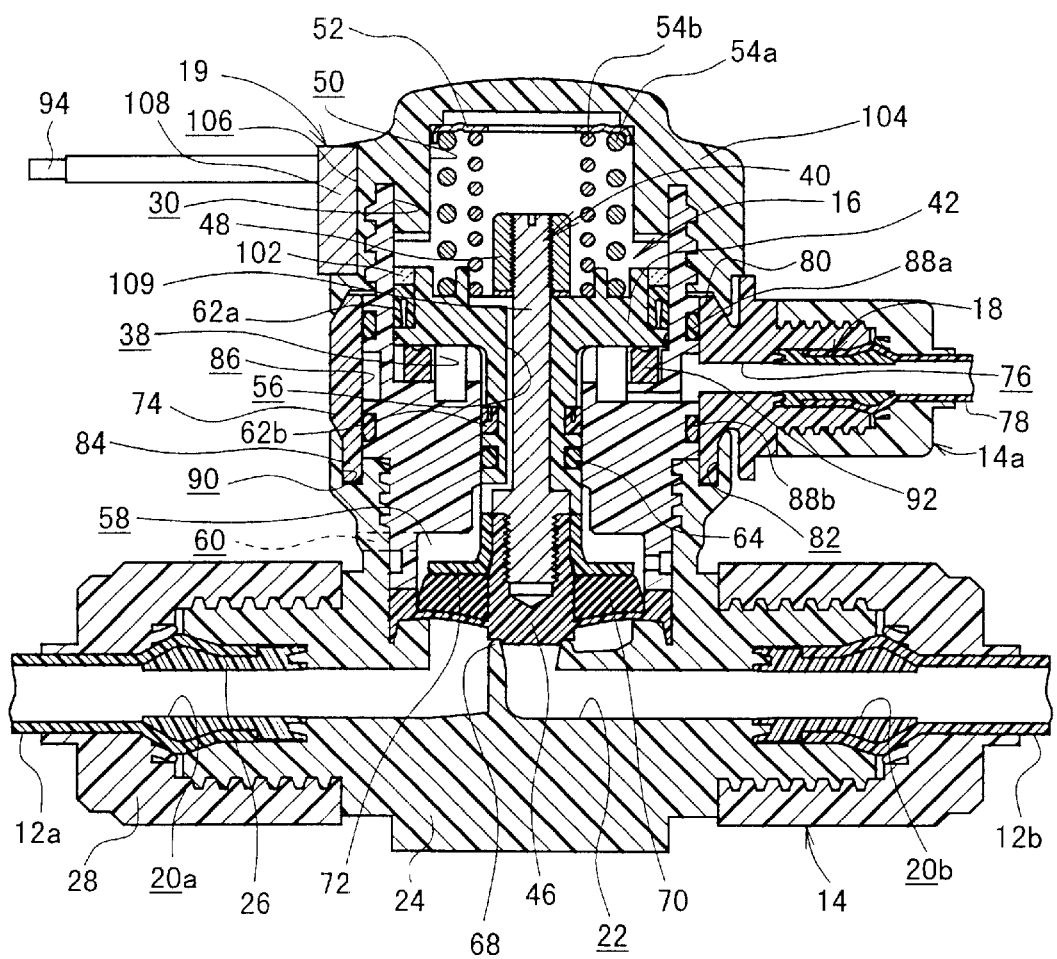
FIG. 2 is a vertical cross sectional view showing a two-way valve according to another embodiment of the present invention.

According to the two-way valve 100 shown in FIG. 2, a ring-shaped magnet (detection object) 102 is attached to the outer circumferential surface of the piston 42. Further, a lead switch 108 is detachably attached to a recess 106 defined on the outer surface of a bonnet 104 with an unillustrated screw member or the like. The magnet 102 generates a magnetic field to turn on the lead switch 108 and the lead switch 108 outputs a detection signal to a controller (not shown). A nut 48 covers the distal end of the rod 109.

With the use of the lead switch 108, it is possible to downsize the detection section 19 for reducing the overall size of the two-way valve 100.

Next, a two-way valve 110 according to still another embodiment of the present invention will be described with reference to FIG. 3.

According to the two-way valve 110, a flow amount adjusting mechanism 120 having a handle 116 and a lock nut 122 is provided. The handle 116 is screwed into a threaded portion 114 of a bonnet 112 such that the handle 116 can be displaced along the threaded portion 114 of the bonnet 112. The lock nut 122 fixes the handle 116 at a predetermined position.

The end surface 118 of the handle 116 abuts against the rod 109 to function as a stopper for limiting the displacement of the rod 109. In this manner, the spacing distance between a diaphragm 46 and a valve seat 68 can be adjusted.

The flow amount adjusting mechanism 120 limits the maximum distance between the diaphragm 46 and the valve seat 68 for adjusting the amount of pressurized fluid (non-pressurized fluid) flowing through a fluid passage 22.

Figure 3:
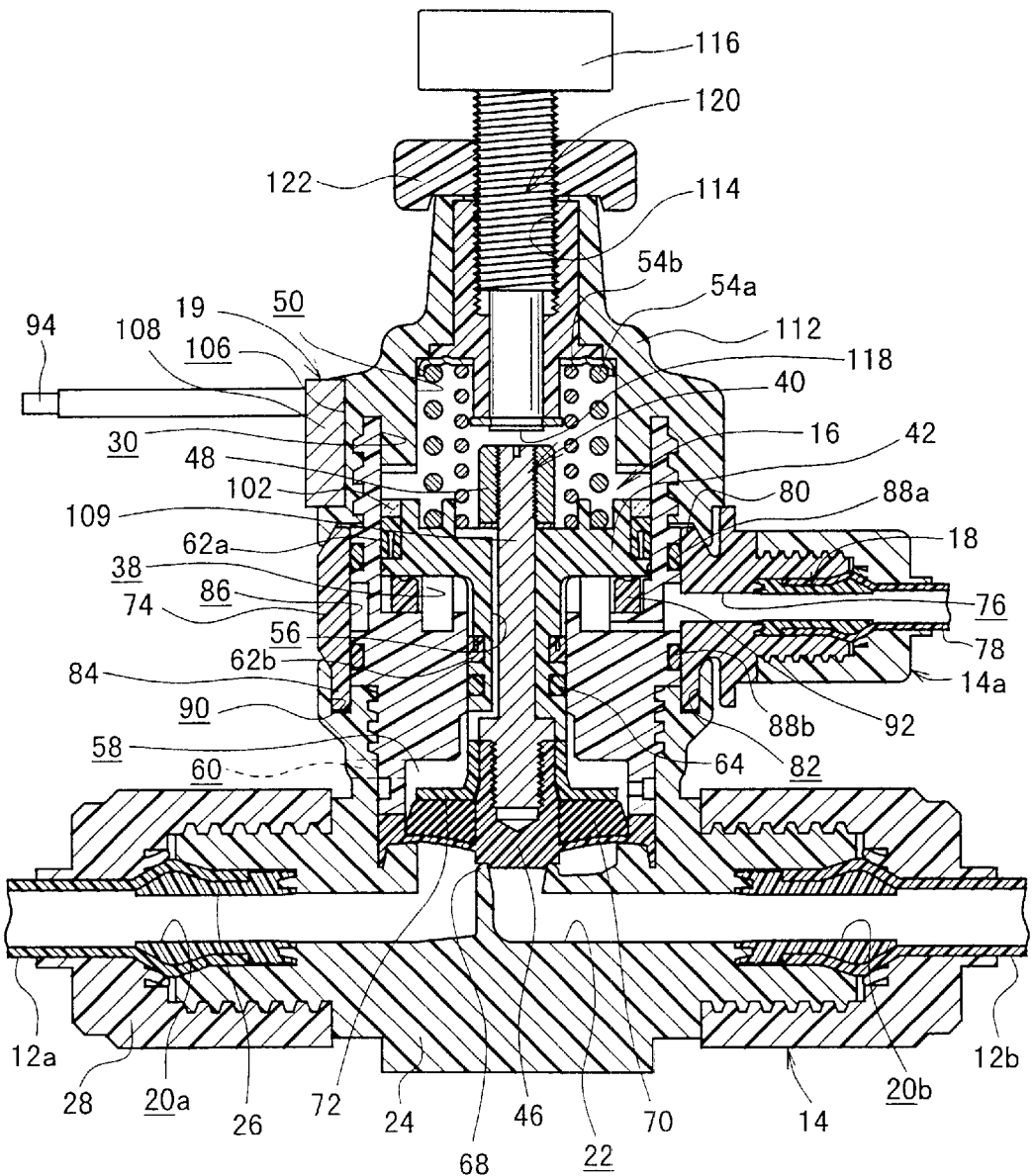
FIG. 3 is a vertical cross sectional view showing a two-way valve according to still another embodiment of the present invention.

Since operations and effects of the two-way valves 100, and 110 shown in FIGS. 2 and 3 are same with those of the in two-way valve 10, descriptions thereof are omitted.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A two-way valve comprising:
   a valve body having a first port at one end, a second port at the other end, and a fluid passage for communication between said first port and said second port;

a valve mechanism having a displacement mechanism including a valve plug for opening and closing said fluid passage, said valve mechanism being disposed in said valve body;

a detection section detachably attached to the outside of said valve body; and a detection object connected to said valve plug so that said detection object can be displaced in unison with said valve plug, wherein said detection object comprises a metallic detection member disposed in a bonnet of said valve body, said detection member having an end facing an opening of said bonnet, wherein said detection section includes a proximity switch that detects said metallic detection member for detecting whether said two-way valve is in the ON state where said fluid passage is opened or said two-way valve is in the OFF state where said fluid passage is closed, and said proximity switch covers said opening of said bonnet.

2. A two-way valve according to claim 1, further comprising a flow amount adjusting mechanism for adjusting the amount of fluid flowing through said fluid passage.

3. A two-way valve according to claim 2, said flow amount adjusting mechanism comprising:

a handle having an end surface for abutment with a rod connected to said valve plug, said handle being screwed into a threaded portion of said bonnet so that said handle can be displaced along said threaded portion of said bonnet; and a lock nut for fixing said handle at a predetermined position.

4. A two-way valve comprising:

a valve body having a first port at one end, a second port at the other end, and a fluid passage for communication between said first port and said second port;

a valve mechanism having a displacement mechanism including a valve plug for opening and closing said fluid passage, said valve mechanism being disposed in said valve body;

a detection section detachably attached to the outside of said valve body;

a detection object connected to said valve plug so that said detection object can be displaced in unison with said valve plug; and a flow amount adjusting mechanism for adjusting an amount of fluid flowing through said fluid passage, said flow amount adjusting mechanism comprising a handle having an end surface for abutment with a rod connected to said valve plug, said handle being screwed into a threaded portion of said bonnet so that said handle can be displaced along said threaded portion of said bonnet, and a lock nut for fixing said handle at a predetermined position, wherein said detection section detects said detection object for detecting whether said two-way valve is in the ON state where said fluid passage is opened or said two-way valve is in the OFF state where said fluid passage is closed.

5. A two-way valve according to claim 4, wherein said detection object comprises a magnet for generating a magnetic field and said detection section includes a lead switch for detecting said magnetic field to output a detection signal.

6. A two-way valve according to claim 5, wherein said lead switch is attached to a recess defined on the outer surface of a bonnet of said valve body.

7. A two-way valve comprising:

a valve body having a first port at one end, a second port at the other end, and a fluid passage for communication between said first port and said second port;

a valve mechanism having a displacement mechanism including a valve plug for opening and closing said fluid passage, said valve mechanism being disposed in said valve body, said displacement mechanism comprising a piston displaceable in a cylinder chamber defined in said valve body when a pilot pressure is supplied to said cylinder chamber, said piston being connected to said valve plug;

a detection object comprising an annular magnet attached to said piston for generating a magnetic field, said detection object being displaced in unison with said valve plug; and a detection section having a lead switch for detecting said magnetic field to output a detection signal, said detection section being detachably attached to the outside of said valve body.

8. A two-way valve according to claim 7, wherein said lead switch is attached to a recess defined on the outer surface of a bonnet of said valve body.

9. A two-way valve according to claim 7, further comprising a flow amount adjusting mechanism for adjusting an amount of fluid flowing through said fluid passage.

10. A two-way valve according to claim 9, said flow amount adjusting mechanism comprising:

a handle having an end surface for abutment with a rod connected to said valve plug, said handle being screwed into a threaded portion of said bonnet so that said handle can be displaced along said threaded portion of said bonnet; and a lock nut for fixing said handle at a predetermined position.

* * * * *